(12) United States Patent
Milillo et al.

(10) Patent No.: US 7,139,874 B1
(45) Date of Patent: *Nov. 21, 2006

(54) SYSTEM AND METHOD FOR PROVIDING CLIENT-DIRECTED STAGING TO IMPROVE NON-SEQUENTIAL ACCESS PERFORMANCE IN A CACHING DISK STORAGE SYSTEM

(75) Inventors: Michael S. Milillo, Lousiville, CO (US); Christopher J. West, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 74 days.

This patent is subject to a terminal disclaimer.

(21) Appl. No.: 10/984,347

(22) Filed: Nov. 9, 2004

Related U.S. Application Data

(63) Continuation of application No. 09/354,482, filed on Jul. 16, 1999, now Pat. No. 6,834,325.

(51) Int. Cl.
*G06F 12/08* (2006.01)
(52) U.S. Cl. .................. 711/113; 711/213; 709/219
(58) Field of Classification Search .............. None
See application file for complete search history.

(56) References Cited

U.S. PATENT DOCUMENTS

| | | | |
|---|---|---|---|
| 5,619,226 A * | 4/1997 | Cahill, III | 345/667 |
| 5,737,747 A | 4/1998 | Vishlitzky et al. | |
| 5,925,100 A * | 7/1999 | Drewry et al. | 709/219 |
| 6,023,726 A | 2/2000 | Saksena | |
| 6,067,565 A | 5/2000 | Horvitz | |
| 6,073,168 A | 6/2000 | Mighdoll et al. | |
| 6,098,064 A | 8/2000 | Pirolli et al. | |
| 6,163,812 A | 12/2000 | Gopal et al. | |
| 6,167,438 A | 12/2000 | Yates et al. | |
| 6,175,900 B1 * | 1/2001 | Forin et al. | 711/156 |

* cited by examiner

*Primary Examiner*—B. James Peikari
(74) *Attorney, Agent, or Firm*—Timothy R. Schulte

(57) ABSTRACT

A client-directed pre-stage operation of a cache memory used to access data blocks from a mass data storage device attached to a host computer through a channel control processor is provided by a method and apparatus comprising a channel control processor for retrieving data blocks from the mass storage device to be pre-staged within the cache memory, a channel interface coupled between the channel control processor and the host computer, a mass storage device interface coupled between the channel control processor and the mass storage device, and a cache memory coupled between the channel interface and the mass storage interface; the cache memory is further coupled to the cache control processor to provide the cache control processor access to data stored within the cache memory. The cache control processor receives a cache bitmap from the host computer to specify the data blocks from the mass storage device to be pre-staged into the cache memory. Each bit within the cache bitmap corresponds to a data block within the mass storage device which may be pre-staged into the cache memory.

20 Claims, 5 Drawing Sheets

SYSTEM AND METHOD FOR PROVIDING CLIENT-DIRECTED STAGING TO IMPROVE NON-SEQUENTIAL ACCESS PERFORMANCE IN A CACHING DISK STORAGE SYSTEM

This application is a continuation of application Ser. No. 09/354,482 filed Jul. 16, 1999, entitled SYSTEM AND METHOD FOR PROVIDING CLIENT-DIRECTED STAGING TO IMPROVE NON-SEQUENTIAL ACCESS PERFORMANCE IN A CACHING DISK STORAGE SYSTEM, and which issued as U.S. Pat. No. 6,834,325.

FIELD OF THE INVENTION

This invention relates in general to a method and apparatus for providing an improved disk caching system within a mass storage system. More particularly, this invention relates to a method and apparatus for providing client-directed staging to improve non-sequential access performance in a caching disk storage system.

BACKGROUND OF THE INVENTION

Modern data processing systems typically comprise a host computer, consisting of an arithmetic and logic unit and a main memory unit for containment of data and instructions presently being processed, and mass storage means for storage of data and processing instructions at other times. The mass storage means is typically connected to the host computer by means of a channel. When the host desires a particular data set or record, it issues a command over the channel to the mass storage means, which then reads the data, from whatever medium it is stored upon, e.g., magnetic disk or tape memory media, over the channel into the main memory of the host. The substantial length of time required to retrieve data from long term storage limits the throughput or usage of the host computer. To minimize this loss of use of the host computer, the host will typically issue a series of requests for data and then perform other tasks while the data is being retrieved from long term disk or tape media. However, even when this "queuing" is performed there is substantial host computer computation time lost due to the time required for accessing data.

Many computer systems use a variety of different memory or data storage devices arranged in a hierarchy. For example, each processor of the computer system has dedicated registers to hold relatively small amounts of data which is frequently and rapidly accessed during processing. In addition random access memory (RAM) is also provided to hold greater amounts of information which can be accessed on a somewhat slower but nonetheless relatively rapid basis. Cache memory is used to hold even greater amounts of data which is accessed less frequently but which nonetheless must be rapidly accessed to avoid significant restrictions in the performance of the computer system. Main memory is employed to hold massive amounts of data, any particular part of which is typically accessed infrequently.

Access time for a memory refers to the amount of time for the processor to gain access to the memory in response to an input request to receive or read data from the memory, or to gain access to the memory in response to an output request to record or write data into the memory. In general, access time is that time which occurs after an input/output (I/O) request and before a read/write operation is accomplished. The amount of access time of a computer system is dependent upon the inherent speed characteristics of the memory device itself, and the ability of the system as a whole to accommodate the I/O request. To increase the amount of data processing, it is important to minimize the access time. Increased access times result in greater time periods of inactivity from the computer system, thereby decreasing its performance.

The hierarchy of memory devices is intended to reduce access times and improve computer system performance by minimizing the non-productive times when the processor is waiting to read or write data. Because the registers associated with the processors are written to and read from frequently and continually during processing, the registers are typically solid state devices which have very quick access times comparable to the clock or cycle times of the processor. The RAM which is also solid state memory provides greater data holding capacity and still obtains relatively quick access times. Cache memory typically has a much higher capacity than the RAM but has slower access times. The cache memory is typically implemented larger amounts of slower solid state memory. The main memory may be one or more mass storage disk drives, tape reel devices, a library of tape cartridges and other types of extremely high capacity mass storage devices.

In general, as the capacity of the memory increases the access time also increases. It is therefore important to attempt to move the data which is more likely to be needed for a particular processing operation up the hierarchy of memory, to make that data more rapidly available in less access time when it is needed for a processing operation. In general, higher performance computer systems use memory management control processors associated with cache and main memory to process I/O requests and transfer data from the main memory to the cache memory, so that the transferred data will be more quickly available for processing.

Because of the reduced access time of the cache memory, as compared to the main memory, the overall performance of the computer system is greatly enhanced if all I/O requests may be satisfied from cache memory. Each successful satisfaction of an I/O request from cache memory is sometimes referred to as a "hit". When it is not possible to satisfy an I/O request through the cache memory, further processing by the host computer is stopped or "blocked". A blocked I/O request results in a system "disconnect," during which time the cache memory is disconnected from the processor. A system disconnect is required to read the requested information from the main memory and to write it to the cache memory. A system disconnect also occurs when previously recorded data in the cache memory is eliminated or discarded by freeing space from the cache memory in order to accommodate an output request from the processor. A disconnect can account for hundreds of milliseconds of time delays while the demand for data not presently contained in the cache memory or the demand for free space not presently contained in the cache memory is resolved.

Data caching as part of mass storage devices is a well known technique for eliminating delays in memory access due to mechanical limitations of a storage device. For example, in the case of a disk drive, plural disks rotate at a fixed speed past read/write heads which may either be stationary with respect to the disk or move radically back and forth with respect to the disk in order to juxtapose the heads to various portions of the disk surfaces. In either case, there is a finite average time (access time) required for a particular data record to be located and read from the disk. This "access" time includes the time for a head to move to the correct cylinder (seek time) and the time required (or latency) for the disk to rotate with respect to the head until the beginning of the particular record sought is juxtaposed to the head for reading and writing.

Cache data storage eliminates these inherent delays by storing records in frequently accessed tracks in a high speed system memory (e.g., solid-state RAM). The idea is simply to allow as many memory accesses as possible to immediately retrieve data from the high speed system memory rather than wait for the data to be transferred (or staged) from the slower disk storage device to the high speed system memory. To accomplish this task, data may be staged into the high speed system memory before data access is required (i.e., pre-staged).

Clearly, the effectiveness of the cache data storage system is limited by the system's ability to anticipate the needs of future memory accesses and transfer those data records from disk storage to the high speed system memory prior to the memory access. If a sequence of memory accesses is random in nature, the cache data storage system cannot anticipate future memory accesses. Accordingly, one method of anticipating future memory accesses is to identify sequential or near sequential memory accesses. Once a sequential or near sequential access is identified, future records/tracks in the sequence can be immediately pre-staged into the high speed system memory in advance of future memory accesses.

Since the memory subsystem utilized for cache buffers has a smaller capacity than the total capacity of the mass storage system, the memory subsystem is managed by a local CPU which attempts to keep the most recently accessed data in the cache buffers. When the cache buffers become filled, older data in the cache buffers must be discarded to make room for newer, more recently accessed, data to be stored in cache buffers. To make room for new data in the cache buffers, the local CPU of the memory subsystem of prior designs locates the least recently referenced (typically referred to as least recently used or LRU) cache buffer and discards it. New data, more recently referenced is then placed in the vacated cache buffers.

Prior methods used to locate the LRU cache buffer maintain various linked list data structures, one data structure per cache buffer in the memory subsystem. As each cache buffer is referenced by a request from a host computer system, that data structure is unlinked from the linked list in its current position and relinked to the top of the linked list. Over time, these methods migrate the more recently used cache buffers toward the top of the list and the least recently used cache buffers toward the bottom of the list. Some prior methods have maintained a doubly linked list to reduce the processing time required for moving a data structure from its current position in the list to the top of the linked list. All of these methods for trying to predict which data located on mass storage devices will be requested by a host computer fail to effectively predict the location of this data under different circumstances. While each method is effective under some circumstances, all methods are likely to fail under some other set of data processing environments.

It is against this background of information that the improvements in managing the use of cache memory in a computer system according to the present invention have evolved.

SUMMARY OF THE INVENTION

To overcome the limitations in the prior art described above, and to overcome other limitations that will become apparent upon reading and understanding the present specification, the present invention discloses a method and apparatus for providing client-directed staging to improve non-sequential access performance in a caching disk storage system.

A system in accordance with the principles of the present invention includes a method for providing a client-directed pre-stage operation of a cache memory used to access data blocks from a mass data storage device attached to a host computer through a channel control processor, the method comprises determining a set of data files to be retrieved from the mass storage device, retrieving a set of track locations comprising the set of data files to be retrieved from the mass storage device, generating the cache bitmap for transfer to the channel control processor, transmitting a cache bitmap from the host computer to the channel control processor, the cache bitmap comprises a plurality of bits, causing the channel control processor to pre-stage into the cache memory data blocks from the mass data storage device corresponding to bits in the cache bitmap set to a logical one, and retrieving one or more byte of data from the data blocks pre-staged into the cache memory.

Other embodiments of a system in accordance with the principles of the invention may include alternative or optional additional aspects. One such aspect of the present invention is a method for providing a client-directed pre-stage operation of a cache memory used to access data blocks from a mass data storage device attached to a host computer through a channel control processor, the method comprises receiving a cache bitmap from the host computer to the channel control processor, the cache bitmap comprises a plurality of bits, processing the cache bitmap by the channel control processor to pre-stage into the cache memory data blocks from the mass data storage device corresponding to bits in the cache bitmap set to a logical one, and providing one or more byte of data to the host computer from the data blocks pre-staged into the cache memory.

Another aspect of the present invention is an apparatus for providing a client-directed pre-stage operation of a cache memory used to access data blocks from a mass data storage device attached to a host computer through a channel control processor. The apparatus comprises the channel control processor for retrieving data blocks from the mass storage device to be pre-staged within the cache memory, a channel interface coupled between the channel control processor and the host computer, a mass storage device interface coupled between the channel control processor and the mass storage device, and the cache memory coupled between the channel interface and the mass storage interface; the cache memory is further coupled to the cache control processor to provide the cache control processor access to data stored within the cache memory.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

In general terms, the present invention relates to providing client-directed staging to improve non-sequential access performance in a caching disk storage system. The embodiments of the invention described herein are implemented as logical operations in a mass storage subsystem attached to a host computer system having connections to a distributed network such as the Internet. The logical operations are implemented (1) as a sequence of computer implemented steps running on a computer system and (2) as interconnected machine modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto.

Figure 1:
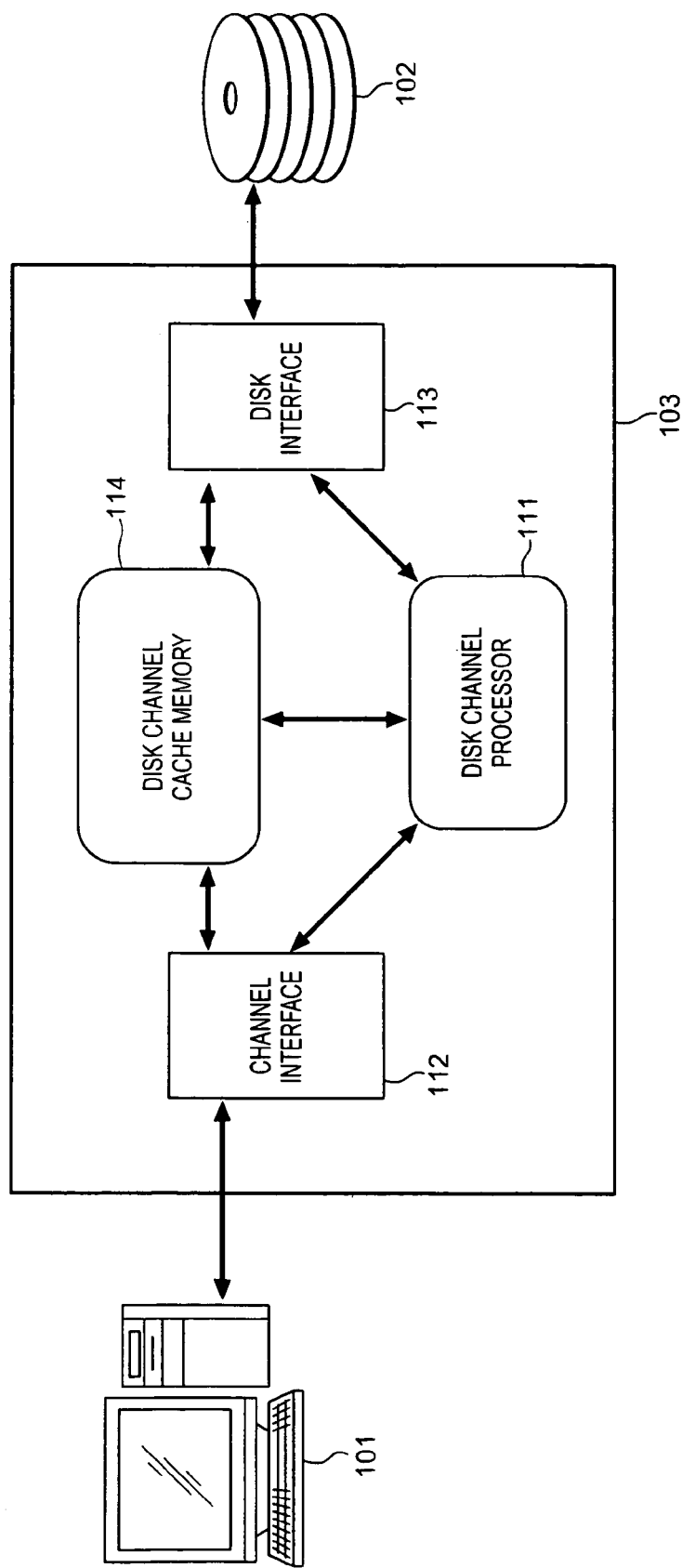
FIG. 1 illustrates a logical block diagram of a mass storage caching subsystem according to an example embodiment of the present invention.

FIG. 1 illustrates a logical block diagram for a mass storage system having a pre-staging cache subsystem. A host computing system 101 stores and retrieves data from a mass storage system 102 utilizing a pre-staging cache subsystem 103. The host computer 101 transmits read and write requests to a channel interface 112 which are ultimately received by a disk channel processor 111. This processor 111 is responsible for obtaining the requested data from the mass storage disks 102 and passing the data to the host computer 101.

The disk channel processor 111 attempts to place data to be requested by the host computer 101 into the disk channel cache memory 114 prior to the host computer 101 sending a request for the data. The disk channel processor 111 communicates with the mass storage disks 102 using its disk interface 113. The data being read off of the mass storage disks 102 passes through the disk channel cache memory 114 before being transmitted to the host computer 101.

Figure 2:
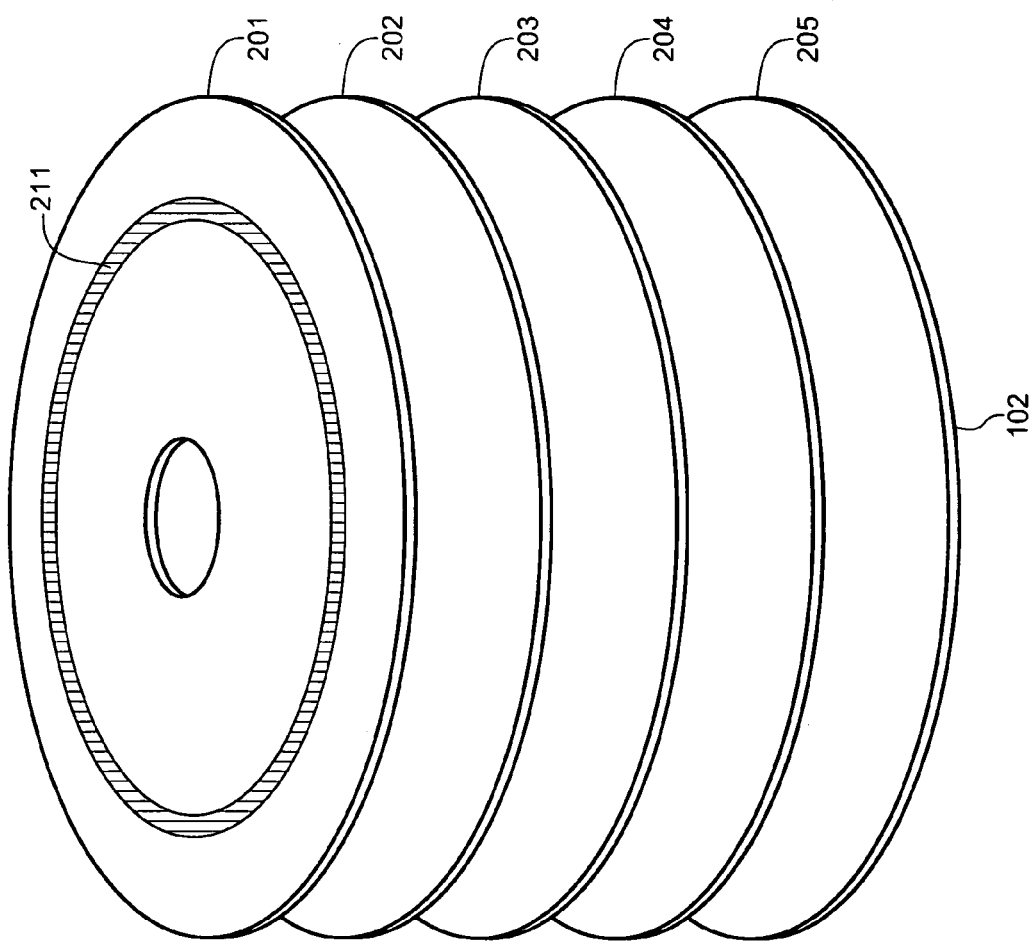
FIG. 2 illustrates a diagram for a mass storage device according to an embodiment of the present invention.

FIG. 2 illustrates a mass storage disk 103 used in accordance with the present invention. The disk 103 typically comprises a plurality of disk platters 201–205 which are located on and rotate about a common central shaft. Each of these platters may comprise a storage medium on each side of these platters. On each of these storage media, data is organized into a series of concentric tracks of data. One particular track, track i 211, is illustrated on platter 201. A single track 211 may comprise one or more sectors containing data. In addition, track i 211 is located on the same concentric position on each side of the platters 201–205. The collection of all tracks identified as track i comprises a cylinder.

For the discussion of the disk cache system according to the present invention contained herein, the disk caching subsystem 103 will be retrieving blocks of data from the mass storage disk 102 for placement within the disk channel cache memory 114. These blocks of data may comprise sectors, tracks, or cylinders without deviating from the spirit and scope of the present invention discussed herein. One of ordinary skill in the art would appreciate how such a system may be modified to operate at any of these levels of data expression.

Figure 3:
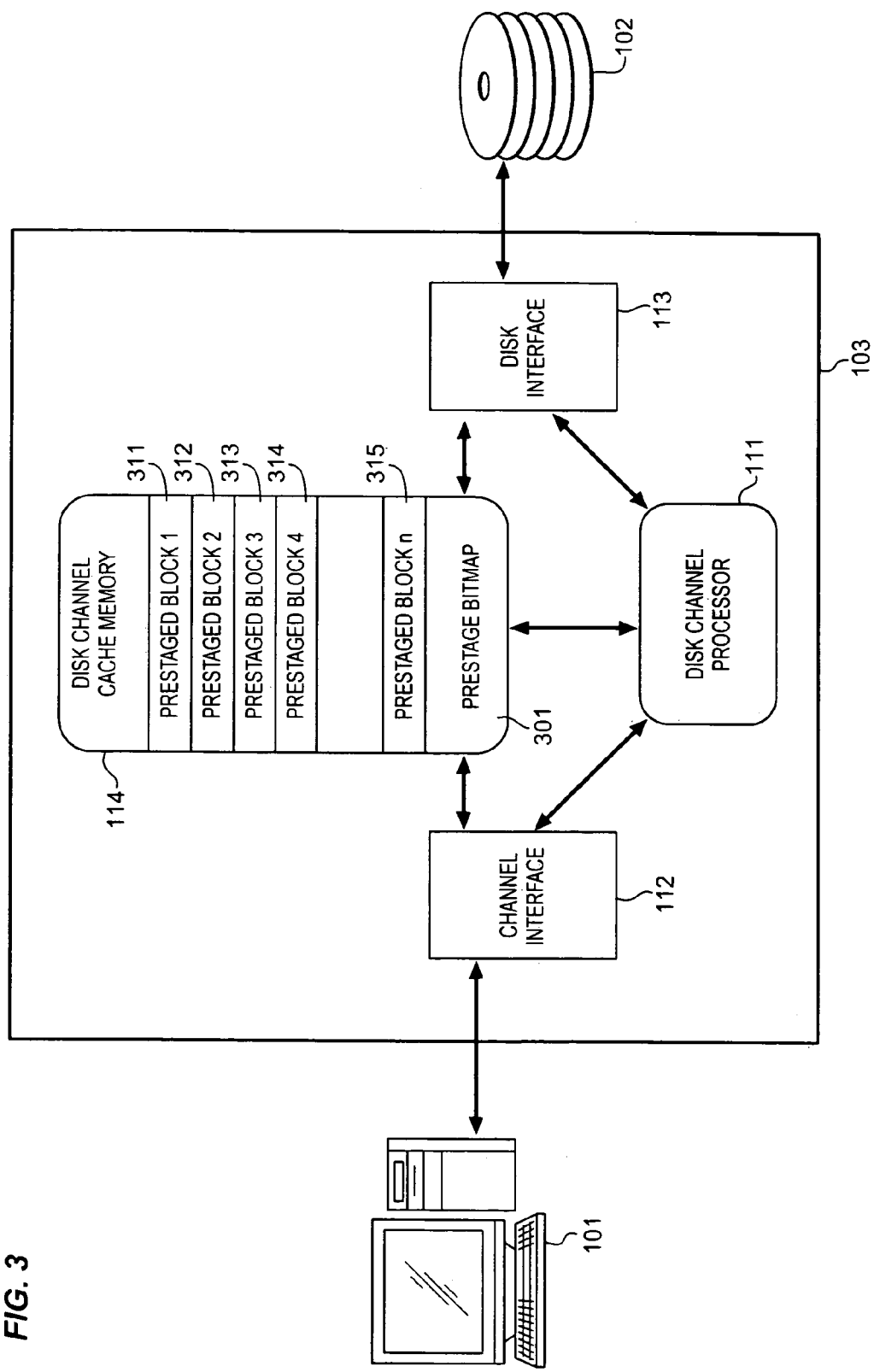
FIG. 3 illustrates a detailed logical block diagram of a mass storage caching subsystem according to one embodiment of the present invention.

FIG. 3 illustrates a logical block diagram of the disk caching subsystem according to another example embodiment of the present invention. Once again, the host computer 101 retrieves blocks of data from the mass storage disks 102. These blocks of data are stored within the pre-staged blocks 311–315 within the disk channel cache memory 114 before being transmitted to the host computer 101. The disk channel cache memory 114 also comprises a pre-stage bitmap 301 to identify the blocks of data from the mass storage disks 102 which are to be preloaded into the disk channel cache memory 114 to be available for use to satisfy a read request from the host computer 101.

The pre-stage bitmap 301 is a set of data transmitted from the host computer to the disk channel processor 111 to identify which blocks of data from the mass storage disks 102 are most likely to be requested by the host processor 101 in upcoming processing. The host computer 101 transmits a command 401 as illustrated within FIG. 4. This command 401 comprises a command field 411, a starting address field 412, a command length 413, and a pre-stage bitmap field 414. The command field 411 is used by the host computer to distinguish various commands from the host computer 101 from each other. The commands may comprise load cache bitmap, read block of data, and write block of data.

The starting address field 412 is used to indicate where to find the first block of data within the mass storage disks 102 to be covered by the bitmap 414 sent as part of the command 401. The bitmap 414 refers to a contiguous area of storage on the mass storage disks 102 starting at the starting address 412 and continuing for one block for each bit located within the bitmap 414. The length field contains the length, in number of bytes, that the command 401 will require. The actual length of the bitmap 414 is obtained by subtracting the length of the other fields from this length. The disk channel processor 111 received and decodes this command and stores the bitmap 414 within the disk channel cache memory 114. The disk channel processor 111 then proceeds to retrieve the blocks of data from mass storage which correspond to a block having a bit within the bitmap set to a "1".

Figure 4:
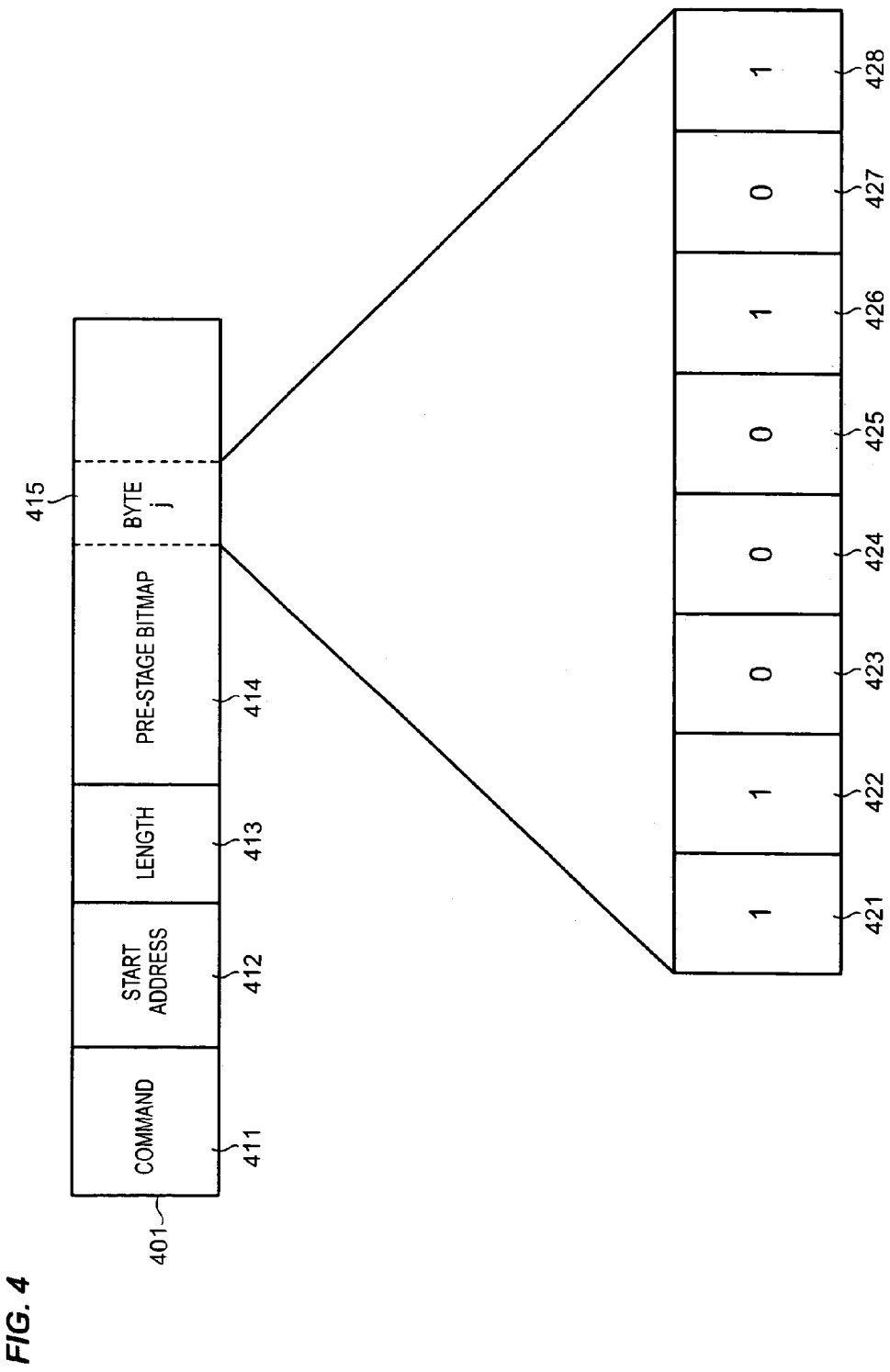
FIG. 4 illustrates an example command utilized to transmit a cache bitmap according to another example embodiment of the present invention.

FIG. 4 illustrates one byte, byte j 415, from within the bitmap 414. Byte j 415 comprises a series of bits 421–428 in which some, but not all of the bits are set to a "1". When the disk channel processor 111 processes this command 401, the disk channel processor 111 will retrieve each block of data corresponding to the bits 421–428 which are set to a "1". These retrieved blocks of data are stored within the disk channel cache memory 114 as pre-staged blocks 311–315. If the pre-stage blocks of data 311–315 are loaded within the disk channel cache memory 114 when a data read request is received, the disk channel processor 111 may respond to the request by providing the data blocks 311–315 directly from the cache memory 114 without needed to access the mass storage disks 102. As long as the host computer 101 anticipates which data blocks will be needed before the requests are made for the data blocks, all of the data requests will find the requested data within the data blocks 311–315 within the disk channel cache memory 114.

The disk channel processor 111 is not required to store the data blocks 311–315 within the cache memory 114 in order to satisfy a host computer's 101 read request. If the host computer 101 generates a read request immediately following a bitmap 414 write operation, the disk channel processor 111 may not have had sufficient time to have pre-staged the data blocks being requested. In such a situation, the disk channel processor 111 detects the cache "miss" and retrieves the data block directly from the mass storage disk 102.

As discussed above, the problem with knowing which disk tracks a client or host computer 101 may request next is generally controlled by the operation of an application process running on the host computer 101. Prior caching systems have used an indicator provided by the host to tell the caching subsystem 103 that the host computer 101 is doing sequential access blocks of data. Other approaches that have the caching subsystem 103 detect sequential access by monitoring data accesses to its volumes. These approaches are efficient for accesses that indeed read each track of each cylinder across the entire extent.

When a host computer 101 wants to read a large number of data blocks that have "skips" in the sequence of blocks requested, then the host computer 101 or caching subsystem 103 may choose one or two options. Either the host computer 101 or caching subsystem 103 performs sequential access to improve cache hits at the cost of pre-staging in unnecessary blocks of data. Alternatively, the host computer 101 or caching subsystem 103 may choose not to perform sequential access which typically results in few if any cache hits when the host computer generates data requests. Depending on the number of data blocks needed versus the number of data blocks skipped, the host computer 101 or caching subsystem 103 provides a less costly alternative.

The host computer 101, according to the present invention, comprises a new channel program that sends the pre-stage bitmap 414 to the caching subsystem 103. This bitmap 414 informs the caching subsystem 103 which data blocks are needed by the application running on the host computer 101. For a cylinder bitmap, if the host computer 101 plans to access only a few tracks on a cylinder, then the host computer 101 may choose not to set the cylinder bit and avoid staging in the tracks that are not needed at the loss of cache hits for those few tracks.

The use of the bitmap 414 allows a reasonable cost trade off between the amount of storage needed for a track bitmap and ability to stage in the entire cylinder with a single bitmap. If a processing environment typically accesses all tracks of a cylinder when it accesses the cylinder, then the above approach works well. If the environment typically only accesses 1 track per cylinder, then a track bitmap is needed at the increased cost of disk channel cache memory 114. The use of a bitmap 414, with the ability for a host process to determine which approach works best for the environment created by this particular host process, permits a caching subsystem 103 to adapt its operation based upon instructions from the process creating the processing environment in question.

There also can be multiple bitmaps per device since there can be multiple host processes may simultaneously be accessing different parts of the same volume as is the case with separate data sets. By using cylinder bitmaps more instances of multiple bitmaps can be stored in the caching subsystem 103 than may be attained with a track bitmap. Since the goal is to provide cache hits across the volume without the requirement that every track of every cylinder be pre-staged, the above mechanism according to the present invention accomplishes this goal by allowing for "skips" in the volume access without requiring strict sequential access.

According to a preferred embodiment of the present invention, the host computer 101 will send a special write command 401 that contains the bitmap of cylinders/tracks 414 that are to be pre-staged. This embodiment will use cylinders for the granularity of the data blocks within the pre-staging requests to reduce the number of bits needed to hold a client request. This approach allows to use less memory to store more requests. Multiple requests per volume are supported as up to 1024 volumes are supported in this embodiment. A volume may possess up to 10,017 cylinders with a typical volume having 3339 cylinders. Each cylinder may posses 15 tracks. Although this embodiment may retain and process more requests, an application process needs to decide if there are enough requested tracks in a cylinder to justify using the cylinder request. When only a few tracks of a cylinder are needed, the application process may decide to skip this cylinder in the pre-stage request to avoid unnecessary pre-staging of data blocks. Typically, application processes will not overlap cylinders in multiple requests because the data block pre-staging requests will typically be file-oriented and the files do not overlap. Alternatively, a track-oriented application process request system may be provided; however, such systems may not be cost effective given the cost-benefit of providing a larger bitmap 414 with a granularity at the track level to increase the efficiency of the pre-staging.

For each request received, the disk subsystem will store the request in the cache. The request is stored within the cache because there are hundreds to thousands of megabytes of cache while there are only sixteen kilobytes of controller memory for the subsystem to use. This is an artifact of a prior subsystem design and not a critical feature of the present invention.

The pre-stage task with the subsystem has the job of spreading the pre-stage track requests evenly across all outstanding requests. We believe that keeping about 12 tracks ahead of the current track that the client/host is accessing is sufficient to maintain nearly 100% cache hit performance. The number twelve is an empirical number that can be different for different types of disk subsystems. Since we are using a cylinder bitmap and each cylinder has 15 tracks to stage, it is more convenient to keep 15 tracks (a cylinder) ahead.

The pre-stage task will organize the requests by volume identifier. Multiple requests per volume will be chained together. The basic servicing algorithm performed by the pre-stage task is get notified that a client/host has just accessed track "X" of cylinder "X." When the notification arrives, the pre-stage task finds the cylinder in one of the chained multiple requests for the specified volume. When it finds the correct bitmap, pre-stage checks to see if the next requested cylinder, "Y," has been pre-staged. Note that cylinder "Y" is the next requested cylinder. Cylinder "Y" may or may not be the next sequential cylinder. If cylinder "Y" has been processed, then nothing else is done. If cylinder "Y" has not been processed, then pre-stages are performed for the tracks of cylinder "Y." As soon as the first track of cylinder "Y" has been accessed, then cylinder "Z," the next requested cylinder, is pre-staged. As a result, pre-stage stays a cylinder ahead. Also, pre-stage only goes as fast as the host is going. When pre-stage gets to the last cylinder, the memory space used by the bitmap is freed to allow the space to be used for another request. If the subsystem runs out of space for requests, it has to give the client an error condition on the special write command. This event may cause the client to either try again later or abandon the request. Note that in the above embodiment, in order to examine the contents of bitmaps, the bitmap 301 or partial bitmap 414 has to be read from disk channel cache to the disk channel processor 111, modified if necessary and written back to the cache 114.

An example of the use of the above caching subsystem 103 would be a backup application for a mass storage disk 102. In a backup process, the host computer gathers tracks, possibly from a collection of files or data sets, and stores the collected tracks onto a tape subsystem. This process typically arises when these tracks are read based upon transferring entire data sets or files that are stored on the volumes. The files or data sets tend to be disbursed through the volume. The tracks are not typically contiguous in many cases. Multiple files or data sets are especially non-contiguous. When multiple data sets are transferred, each data set is request in sequence. The file system would access a certain data set, and thus, look-up and access a set of the tracks known to contain the data set. This process requires the file system to access a table of contents for that volume. From the table of contents and its listing of the data blocks needed, a pre-stage bitmap may be created. Once the bitmap 414 is created, it is sent to the caching subsystem 103 and then the data blocks themselves are requested.

Similarly, if an application process is performing an incremental backup of a volume in which most of the volume is already backed up and now a backup of the differences between the backup and the current system, typically only a small number of files, possibly ten files have changed out of a hundred total files are needed to be accessed. In this situation, these files once again are spread out across a volume. The use of a pre-stage bitmap 414 will allow this small set of data be pre-staged and then quickly and efficiently retrieved to perform the incremental backup.

Figure 5:
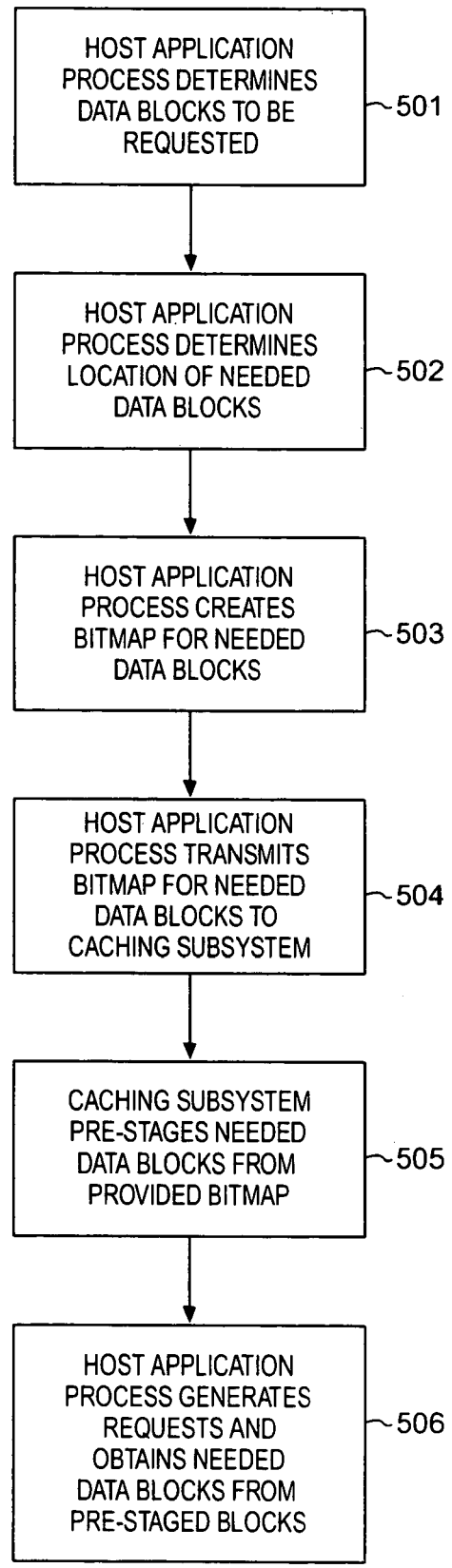
FIG. 5 illustrates a logical operational flow diagram for the operations performed according to one embodiment of the present invention.

FIG. 5 illustrates a logical operational flowchart for the process utilized by the present invention. In operation 501, an application process on the host computer 101 determines the identity of data blocks that are likely to be requested in the immediate future. Next in operation 502, the application process determines the location of the needed data blocks on the mass storage disks 102. Using this data, the application process creates a pre-stage bitmap 414 for the needed data blocks in operation 503.

In operation 504, the host computer 101 transmits the pre-stage bitmap 414 to the caching subsystem 103. Once received, the caching subsystem, in operation 505 will obtain the data blocks corresponding to the needed data blocks identified within the pre-stage bitmap 414. If the needed data blocks have already been pre-staged as blocks 311–315 within the disk channel cache memory 114 before these data blocks are requested, the application process may request these data blocks 311–315 and obtain nearly 100% cache hit efficiency in operation 506.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing a pre-stage operation of a cache memory used to access data blocks from a mass data storage device attached to a host computer through a channel control processor, the method comprising:
   transmitting a plurality of bitmaps from the host computer to the channel control processor, wherein each of the plurality of bitmaps comprises a plurality of bits;
   causing the channel control processor to pre-stage into the cache memory data blocks from the mass data storage device corresponding to enabled bits in at least some of the plurality of bitmaps; and
   retrieving one or more bytes of data from the data blocks pre-staged into the cache memory.

2. The method according to claim 1, wherein the method further comprises:
   determining the location of the data blocks expected to be retrieved from the mass storage device by a plurality of processes executing in the host computer; and
   generating the plurality of bitmaps for transfer to the channel control processor, wherein each of the plurality of bitmaps is generated by a respective one of the plurality of processes.

3. The method according to claim 2, wherein the determining the location of the data blocks comprises:
   determining a set of data files to be retrieved from the mass storage device; and
   determining a set of track locations comprising the set of data files to be retrieved from the mass storage device.

4. The method according to claim 3, wherein the mass storage device comprises a disk drive system, and wherein the step of generating the plurality of bitmaps comprises determining whether to use a cylinder bitmap or a track bitmap based on the data blocks to be retrieved.

5. The method according to claim 4, wherein the step of determining whether to use a cylinder bitmap or a track bitmap is based on location and number of the data blocks to be retrieved.

6. The method according to claim 2, wherein the mass storage device comprises a disk drive system, and wherein the step of generating the plurality of bitmaps comprises determining whether to use a cylinder bitmap or a track bitmap based on the location of the data blocks to be retrieved.

7. The method according to claim 6, wherein the data blocks are cylinders located on the disk drive system.

8. The method according to claim 6, wherein the data blocks are tracks located on the disk drive system.

9. A method for providing a pre-stage operation of a cache memory used to access data blocks from a mass data storage device attached to a host computer through a channel control processor, the method comprising:
   receiving a plurality of bitmaps from the host computer to the channel control processor;
   processing the plurality of bitmaps by the channel control processor to pre-stage into the cache memory data blocks from the mass data storage device corresponding to enabled bits in the bitmap; and
   providing one or more bytes of data to the host computer from the data blocks pre-staged into the cache memory.

10. The method according to claim 9, wherein the step of processing the plurality of bitmaps comprises steps of:
    generating a plurality of pre-stage requests to be issued to the mass data storage device; and organizing the plurality of pre-stage requests by volume identifier.

11. The method according to claim 10, wherein multiple pre-stage requests to a same volume are chained together.

12. A computer-readable medium having computer-executable instructions for the method recited in claim 9.

13. A computer data signal embodied in a carrier wave readable by a computing system and encoding a computer program of instructions for executing a computer process performing the method recited in claim 9.

14. An apparatus for providing a pre-stage operation of a cache memory used to access data blocks from a mass data storage device attached to a host computer through a channel control processor, the apparatus comprising:

the channel control processor for retrieving data blocks from the mass storage device to be pre-staged within the cache memory;

a channel interface coupled between the channel control processor and the host computer;

a mass storage device interface coupled between the channel control processor and the mass storage device; and the cache memory coupled between the channel interface and the mass storage interface; the cache memory is further coupled to the cache control processor to provide the cache control processor access to data stored within the cache memory, wherein the cache control processor receives a plurality of bitmaps from the host computer to specify the data blocks from the mass storage device to be pre-staged into the cache memory.

15. The apparatus according to claim 14, wherein the plurality of bitmaps are stored in the cache memory.

16. The apparatus according to claim 14, wherein the mass storage device comprises a disk drive system.

17. The apparatus according to claim 16, wherein the data blocks are tracks located on the disk drive system.

18. The apparatus according to claim 16, wherein the data blocks are cylinders located on the disk drive system.

19. The apparatus according to claim 14, wherein each of the plurality of bitmaps is generated by a respective one of a plurality of processes executing in the host computer.

20. The apparatus according to claim 14, wherein the channel control processor retrieves certain data blocks from the mass storage device to be pre-staged within the cache memory according to at least some of the plurality of bitmaps.

* * * * *